C. SCHARFFE.
Ruffler for Sewing-Machines.
No. 4,923. Reissued May 28, 1872.
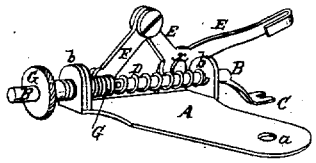
Witnesses
S. M. Pool
D. Pool
Inventor.
William G. Wilson
assignee of Carl Scharffe
by A. Pollok
his atty.
THE NORRIS PETERS CO., PHOTO-LITHO., WASHINGTON, D. C.

UNITED STATES PATENT OFFICE.

CARL SCHARFFE, OF CLEVELAND, OHIO, ASSIGNOR TO WILLIAM G. WILSON, OF SAME PLACE.

IMPROVEMENT IN RUFFLERS FOR SEWING-MACHINES.

Specification forming part of Letters Patent No. 89,085, dated April 20, 1869; reissue No. 4,923, dated May 28, 1872.

*To whom it may concern:*

Be it known that CARL SCHARFFE, of Cleveland, county of Cuyahoga, and State of Ohio, has invented certain new and useful Improvements in Gathering Attachments for Sewing-Machines, of which the following is a specification:

This invention relates to gathering, plaiting, or ruffling attachments for sewing-machines, and has special reference to that class of such attachments in which the gathering knife, blade, or edge, is operated from or by the needle bar or arm. The invention may be stated in general terms to consist of a gathering attachment for sewing-machines, composed of a bed-plate adapted to be secured to the cloth-plate of a sewing-machine in combination with a reciprocating gatherer arranged to be operated from or by the needle arm or bar. To actuate the gatherer a pivoted vibratory lever or arm is employed, which is carried by the bed-plate of the attachment and operated from or by the moving needle bar or arm of the sewing-machine. There is also combined with the gatherer means for adjusting the movement of the same, for the purpose of regulating the length of gather.

The accompanying drawing represents in perspective a gathering attachment embodying the several features of invention above recited.

The bed-plate which supports the various parts of the attachment is shown at A provided with a hole, *a*, through which passes the thumb-screw for securing the attachment to the cloth-plate of the sewing-machine. C is the gathering edge, knife, or blade, which lays the work in plaits or gathers as desired. It is secured to a holder, B, which is supported in suitable bearings *b b* on the bed-plate in such manner that it may reciprocate back and forth therein. Its arrangement is such that, during its movement, it is maintained parallel with the bed-plate A, and consequently with the cloth-plate of the sewing-machine on which the part A rests. With the holder B is connected a lever or arm, E, pivoted to an ear on the bed-plate at *x*. Through the medium of this pivoted vibratory lever motion is imparted to the gatherer from the needle bar or arm of the sewing-machine. The motion of the lever to operate the gatherer is effected in this instance by the needle-bar in its descent pressing down the longer arm of the lever, which has a hook or loop on its outer end through which the needle will pass. The best shape to give the part E is that of an angle or bell crank lever, as shown, the pivotal point *x* being at the angle of the lever. The shorter arm of this vibratory lever is connected with the holder B by a link, F, jointed at one end to the shorter arm of the angle-lever, and at the other end to a pin projecting laterally from the holder. The downward movement of the lever E produces the movement of the gatherer in one direction. To provide for its movement in the other direction a spring, D, is arranged between the forward bearing *b* of the holder and a pin or stop on the rear portion of the holder which, when the gatherer is advanced by the downward movement of the lever E, will by this movement be compressed between its two bearing points. Consequently when the needle-bar rises and releases the lever E the spring will expand, carrying back the gatherer and causing the outer arm of the lever to rise. To adjust or regulate the length of gather there is a tubular thumb-screw, G, encircling the holder B at one end, and screwing through the ear *b* at that end. The front of this screw bears against the pin which connects the link F with the holder, and by advancing the screw the reciprocating play of the holder may be diminished to the desired extent. In a gathering attachment thus organized all the parts are carried by a bed-plate adapted to be secured to the sewing-machine cloth-plate, and the reciprocating gathering-knife is operated from or by the needle bar or arm of the sewing-machine when in motion, through the intermediary of a pivoted vibratory lever, which by means of adjusting devices can be caused to impart a greater or less length of movement to the reciprocating gatherer, as desired.

What is claimed as the invention of the said Carl Scharffe is as follows:

1. The combination, in a gathering, ruffling, or plaiting attachment for sewing-machines, of a bed-plate adapted to be attached to the sewing-machine cloth-plate, and a reciprocating gatherer operated through a pivoted arm or lever from or by the needle arm or bar, substantially as shown and described.

2. As a means for actuating the reciprocating gatherer, an angle or bell crank lever, pivoted at its angle, connected at one end with said gatherer, and arranged at the other end to be operated from or by the needle arm or bar, substantially as shown and set forth.

3. In a gathering attachment, the combination of a bed-plate adapted to be secured to the sewing-machine cloth-plate, a reciprocating gatherer moving in a plane parallel with the cloth-plate of the machine, to which the attachment may be applied, and a vibratory arm or lever for actuating said gatherer operated from the needle arm or bar, substantially as shown and set forth.

4. The bed-plate, reciprocating gatherer, and its pivoted vibratory actuating arm operated from the needle bar or arm, substantially as specified, in combination with means for adjusting and regulating the length of movement of said gatherer, substantially as set forth.

5. In combination with the reciprocating holder and vibratory pivoted lever, actuated from the needle-bar to move said holder in one direction, the spring arranged to move said holder in the opposite direction, when pressure on said lever is removed, substantially as shown and set forth.

In testimony whereof I have signed my name to this specification, before two subscribing witnesses.

WILLIAM G. WILSON.

Witnesses:
S. E. HENDERSON,
B. HELLERE.